United States Patent
Wendkos et al.

(10) Patent No.: US 8,515,334 B1
(45) Date of Patent: Aug. 20, 2013

(54) SYSTEMS AND METHODS FOR DELIVERING AND PRESENTING PERSONALIZED EDUCATIONAL LESSONS

(75) Inventors: Brad Wendkos, St. Petersburg, FL (US); Andrian Pervazov, St. Petersburg, FL (US); Alison Hasbach, St. Petersburg, FL (US)

(73) Assignee: TrueFire, Inc., Saint Petersburg, FL (US)

(*) Notice: Subject to any disclaimer, the term of this patent is extended or adjusted under 35 U.S.C. 154(b) by 740 days.

(21) Appl. No.: 11/945,829

(22) Filed: Nov. 27, 2007

Related U.S. Application Data

(60) Provisional application No. 60/861,104, filed on Nov. 27, 2006.

(51) Int. Cl.
*G09B 3/00* (2006.01)

(52) U.S. Cl.
USPC ..................... 434/350; 434/307 R

(58) Field of Classification Search
USPC ............ 434/118, 322, 323, 350, 336, 307 A, 434/307 R
See application file for complete search history.

(56) References Cited

U.S. PATENT DOCUMENTS

| | | | |
|---|---|---|---|
| 6,025,550 A * | 2/2000 | Kato | 84/464 A |
| 6,072,113 A * | 6/2000 | Tohgi et al. | 84/470 R |
| 6,149,441 A * | 11/2000 | Pellegrino et al. | 434/350 |
| 6,211,451 B1 * | 4/2001 | Tohgi et al. | 84/470 R |
| 6,660,922 B1 * | 12/2003 | Roeder | 84/477 R |
| 7,653,761 B2 * | 1/2010 | Juster et al. | 710/18 |
| 2002/0004191 A1 * | 1/2002 | Tice et al. | 434/350 |
| 2003/0027121 A1 * | 2/2003 | Grudnitski et al. | 434/308 |
| 2003/0036046 A1 * | 2/2003 | Smolover | 434/350 |
| 2003/0039948 A1 * | 2/2003 | Donahue | 434/322 |
| 2003/0046261 A1 * | 3/2003 | Baker | 707/1 |
| 2004/0191744 A1 * | 9/2004 | Guirguis | 434/322 |
| 2005/0089835 A1 * | 4/2005 | Soldavini et al. | 434/350 |
| 2005/0214728 A1 * | 9/2005 | Kikuchi et al. | 434/307 R |
| 2006/0101984 A1 * | 5/2006 | Ikawa et al. | 84/609 |
| 2006/0166174 A1 * | 7/2006 | Rowe et al. | 434/236 |
| 2006/0196343 A1 * | 9/2006 | Yung | 84/470 R |
| 2007/0016650 A1 * | 1/2007 | Gilbert et al. | 709/207 |
| 2007/0099164 A1 * | 5/2007 | Philipp et al. | 434/350 |
| 2007/0143130 A1 * | 6/2007 | Hearn | 705/1 |

* cited by examiner

*Primary Examiner* — Bruk Gebremichael
(74) *Attorney, Agent, or Firm* — Stoock & Stroock & Lavan

(57) ABSTRACT

In accordance with the present invention, an interactive education application is provided. The application receives preferences from the user and retrieves media assets, where the application assembles the media assets and other content into a personalized lesson. In addition, the application provides messaging features between the user and other users relating to the personalized lesson.

8 Claims, 15 Drawing Sheets

… (1)

SYSTEMS AND METHODS FOR DELIVERING AND PRESENTING PERSONALIZED EDUCATIONAL LESSONS

CROSS-REFERENCE TO RELATED APPLICATION

This application claims the benefit of U.S. Provisional Patent Application No. 60/861,104, filed on Nov. 27, 2006, which is hereby incorporated by reference herein in its entirety.

This application is related to U.S. patent application Ser. No. 11/068,033, filed on Feb. 28, 2005, which claims the benefit of U.S. Provisional Patent Application No. 60/547,486, filed on Feb. 26, 2004, which are hereby incorporated by reference herein in their entireties.

FIELD OF THE INVENTION

The present invention generally relates to systems and method for providing an interactive education application. More particularly, the present invention relates to an interactive education application that delivers, assembles, presents, and updates personalized courses, such as music lessons, to a user.

BACKGROUND OF THE INVENTION

Learning to play a musical instrument is a challenging task for most students. While playing simple melodies on a musical instrument can often be done, it is difficult to learn a sufficient level of the proper techniques in order to play and master even relatively simple musical works. Developing a proficiency in playing a musical instrument requires dedication, constant practice, and the application of proper playing techniques and methods.

There are a wide variety of teaching methods that are currently used to train music students of all levels. These include music books and methods (e.g., the Suzuki method for reading music), audio tapes and compact discs, CD-ROMs, DVDs, video tapes, and other hard goods. While each of these offers certain advantages, we have determined that each of these approaches are limited in the manner in which information is presented to the student. For example, these music educational products are generally linear, which take each student from one conceptual lesson (e.g., learning to sight read music) to another conceptual lesson (e.g., learning to play scales). Each student is expected to follow and practice the techniques provided in one lesson before moving onto the next lesson in sequential order. These products often fail because teaching music requires a level of interaction with each student. In addition, each of these teaching methods usually requires the hard goods to be shipped to the student, which may include packaging costs, handling costs, shipping costs, and/or delays.

Many students also have intermediate goals in learning to play a musical instrument, such as, for example, playing a song a student heard on the radio or a particular recording. While learning the proper playing techniques from the previously mentioned teaching methods may help the student to play that song, these teaching methods do not take such goals into account. Even further, many students become bored with these technique-oriented methods and advance directly to the sheet music or tablature to attempt to play the song that the student heard on the radio. As a result, the student struggles to play the song or the musical work and eventually becomes discouraged.

Accordingly, it would be desirable to provide systems and methods that overcome these and other deficiencies of the prior art.

For example, it would be desirable to provide an interactive education application that delivers, assembles, presents, and updates personalized courses, such as music lessons, to a user.

SUMMARY OF THE INVENTION

In accordance with the present invention, systems and methods for providing an interactive education application are provided. In particular, systems and methods for providing an interactive education application that delivers, assembles, presents, and updates personalized courses are provided.

In accordance with some embodiments of the present invention, a method for assembling educational courses is provided. One or more preferences associated with an educational course (e.g., a music lesson) are received from a user. Using the received preferences, the application determines a subset of media assets from a plurality of media assets. Each media asset is one of: a video clip, an audio clip, text, an educational chart, music notation, music tablature, and sheet music. The subset of media assets is retrieved from a database while a message is simultaneously transmitted to the user relating to the generation of the educational course. The subset of media assets is compiled into a personalized educational lesson and the personalized educational lesson is provided to the user.

In some embodiments, the application determines whether updated media assets are available for retrieval and, in response to determining that updated media assets are available, retrieves the updated media assets. The application compiles the updated media assets with the subset of media assets, where the updated media assets replace at least a portion of the subset of media assets.

In some embodiments, the application transmits a sample clip of the user to an instructor. In response, the application receives an evaluation from the instructor. It should be noted that the evaluation may be associated with the received preference, thereby assisting the generation of the personalized educational lesson.

In some embodiments, the application may access one or more rules relating to the educational course and apply the one or more rules to the received preferences in order to generate a personalized education lesson.

It should be noted that, in some embodiments, one of the subset of media assets is a template, and the subset of media assets is compiled by inserting a portion of the subset of media assets into the template.

In some embodiments, the subset of media assets retrieved by the application are the only media assets necessary to generate the customized educational lesson.

In some embodiments, the application retrieves a second set of media assets and compiles a subsequent personalized lesson for the user.

In some embodiments, the application receives updated preferences from the user and, in response, determines and retrieves updated media assets in response to the updated preferences. The application compiles the updated media assets with the subset of media assets, where the updated media assets replace at least a portion of the subset of media assets.

It should be noted that the transmitted message informs the user that: the subset of media is being downloaded, the personalized educational lesson is being compiled, updated media assets are available, and/or additional courses are available.

In accordance with some embodiments of the present invention, a method for generating a plurality of music lessons is provided. One or more preferences associated with a music lesson are received from a user. It should be noted that the preferences may be one of a music style, a music genre, an educational level, information relating to previous instruction, information relating to a musical instrument, and an educational goal. Using the received preferences, the application determines a first subset of media assets from a plurality of media assets. Each media asset is one of: a lesson template, a video clip, an audio clip, text, an educational chart, music notation, music tablature, and sheet music. The first subset of media assets is retrieved from a database while a message is simultaneously transmitted to the user relating to the generation of the educational course. The message includes information relating to the first subset of media assets and progress information relating to the generation of the music lesson. The first subset of media assets is compiled into a personalized educational lesson by inserting a plurality of the first subset of media assets into the lesson template, thereby generating the personalized music lesson. The personalized music lesson is displayed to the user.

In response to a predetermined time (e.g., a week has passed), receiving an indication from the user (e.g., the user is ready for the next lesson), or receiving an indication from an instructor (e.g., that the user is ready for the next lesson), the application automatically retrieves a second subset of media assets from the database while simultaneously transmitting an update message to the user relating to the generation of a subsequent music lesson. Similarly, the update message includes information relating to the first subset of media assets and progress information relating to the generation of the music lesson. The application compiles the second subset of media assets into a subsequent personalized educational lesson by replacing the first subset of media assets with the second subset of media assets in the lesson template, thereby generating the subsequent personalized music lesson. The subsequent personalized music lesson is displayed to the user.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF THE INVENTION

Figure 1:
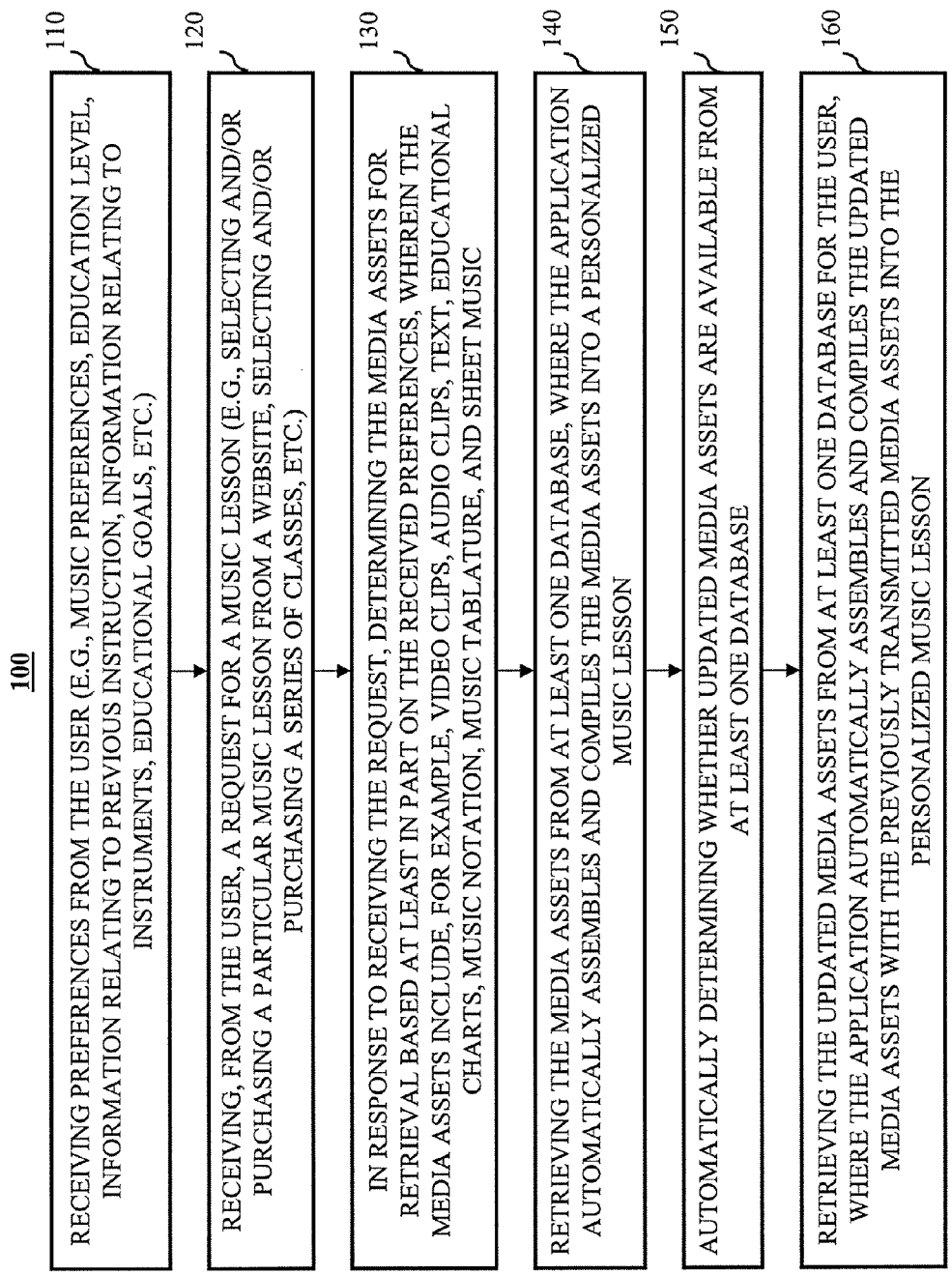
FIG. 1 is a flowchart illustrating the steps performed in providing an interactive education application that presents a lesson in accordance with some embodiments of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

In accordance with the present invention, an interactive education application (sometimes referred to herein as "the application" or "the desktop software utility and process (DSUP)") is provided. The application receives preferences from the user and retrieves media assets, where the application assembles the media assets and other content into a personalized lesson. In addition, the application provides messaging features between the user and other users (e.g., users at the server, music instructors, etc.).

Generally speaking, without requiring users to purchase entire volumes of lessons and waiting for the entire volume of lessons (e.g., on a compact disc, CD-ROM, DVD, textbook, or other format) to be shipped to the user, the application uses preferences inputted by the user to facilitate the selection, delivery, compilation, and presentation of a music lesson. Each music lesson includes a particular compilation of media assets that are retrieved by the application. As used herein, media assets may include, for example, video clips, audio clips, text, educational charts, music notation, music tablature, sheet music, or any other suitable content.

It should be noted that although the following embodiments of the invention are described as relating to the compiling and presenting of music lessons, these embodiments are not limited only to providing music lessons. Rather, the invention may also be applied to any suitable content, such as educational content, foreign language courses, art classes, computer courses, as well as any content that is arranged in a compilation of data that are retrieved by the application and provided to the user in a staged and/or periodic manner.

The following figures and their accompanying descriptions provide detailed examples of the implementation of the systems and methods of the present invention.

Turning to FIG. 1, a simplified flowchart illustrating the steps performed in providing an interactive education application that generates personalized lessons in accordance with some embodiments of the present invention is provided. This is a generalized flow chart. It will be understood that the steps shown in FIG. 1 may be performed in any suitable order, some steps may be deleted, and others added.

Figure 2:
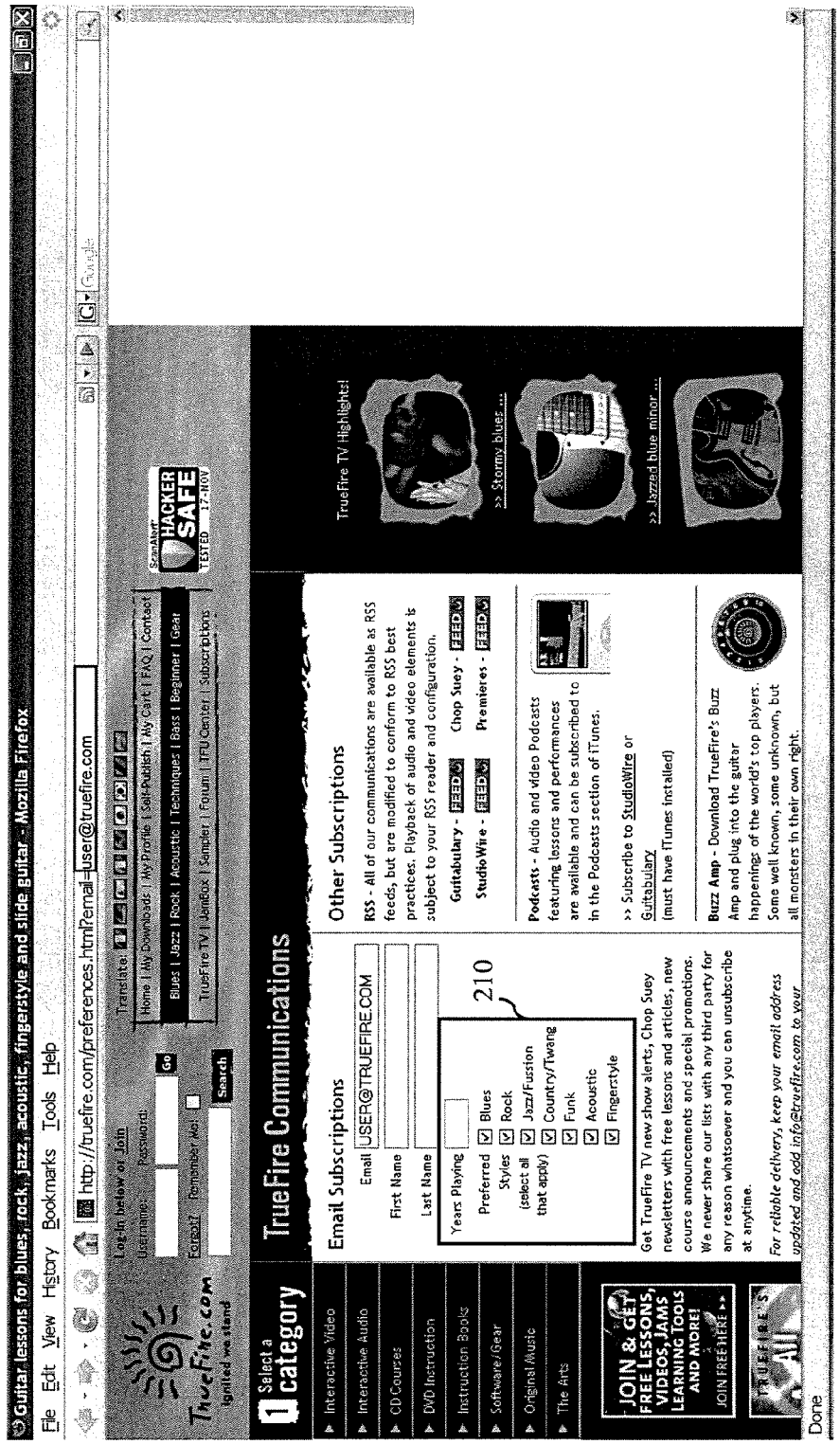
FIG. 2 is an illustrative preferences screen of the interactive education application in accordance with some embodiments of the present invention.

As shown in FIG. 1, the process begins with receiving preferences from the user (step 110). For example, as shown in FIG. 2, upon initiating an illustrative webpage 200 or any other suitable display, the user may be prompted to input user preferences 210. These preferences 210 may include, for example, preferred music styles, an education level, information relating to previous instruction, information relating to instruments, educational goals, etc. For example, FIG. 2 shows that the user is requested to input the educational level ("Years Playing") and preferred music styles (e.g., classical, blues, rock, jazz/fusion, country/twang, funk, acoustic, and/ or fingerstyle). In another example, the user may be prompted to input the number of years that the user has received instruction, the type of instruction that the user has received (e.g., public classes, private instruction, etc.), a self-assessment for the level of play, the lesson and/or course instruction desired (e.g., technique, theory, picking, improvisation, harmony, etc.), the music styles that the user has previously played, the instruments that the user has previously played (e.g., the acoustic guitar, the electric guitar, and the bass guitar), the level of difficulty of the songs that the user has played, and/or the particular techniques that the user has mastered (e.g., sight reading, pitch, major scales, etc.).

In some embodiments, the application may allow the user to upload an audio clip and/or a video clip of a music performance by the user or a sample of the user's techniques and skill level. The application may transmit the clip to, for example, an instructor, where the instructor reviews the clip. In response to reviewing the clip, the instructor may provide the application with an evaluation on the user's educational level in order to personalize the music lesson.

In some embodiments, the application may allow the user to select from a list of song titles to indicate which songs the user would like to be able to play on a musical instrument. The application may use the selections from the user to determine which lessons, media assets, and/or other content to retrieve from the database. For example, in response to the user indicating that the user has not played the guitar before and selecting the songs "Siamese Dream by Smashing Pumpkins" and "Cherub Rock by Smashing Pumpkins" as future goals, the application may interpret these selections and retrieve the appropriate media assets, such as portions of the beginner guitar techniques lesson and its associated media assets, portions of the "Pick Tricks" lesson and its associated media assets, background audio clips in the rock category, the guitar tablatures associated with each lesson, and the guitar tablature for "Siamese Dream."

Figure 3A:
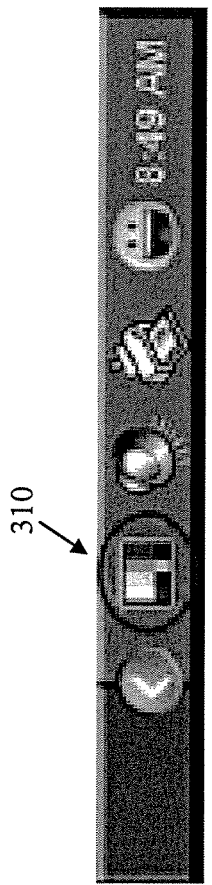
FIG. 3A is an illustrative taskbar with an icon of the interactive education application in accordance with some embodiments of the present invention.
Figure 3B:
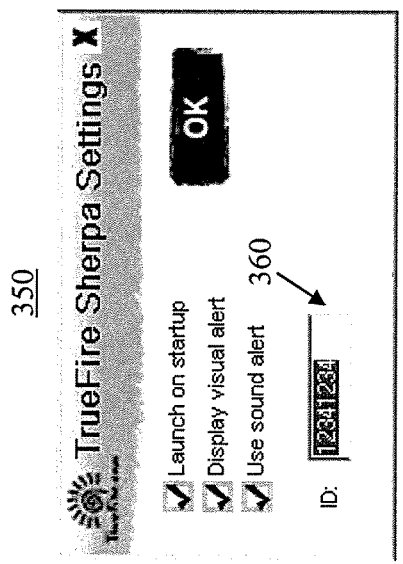
FIG. 3B is an illustrative settings screen of the interactive education application in accordance with some embodiments of the present invention.

It should be noted that, in some embodiments, process 100 begins with the user launching the application (e.g., the application as locally installed on the user's computer, handheld device, television, etc.). As shown in FIG. 3A, in response to launching the application, the application may become resident on the user's computer and visible to the user as an icon (e.g., icon 310) in a toolbar or system tray. In response to selecting icon 310 or any other suitable interface, the application may allow the user to input a unique identifier, such as a username. As shown in FIG. 3B, the user has inputted "12341234" into the unique identifier field 360. In response, the application interacts with a server and the multiple databases connected to the server in order to construct a personalized lesson for the user. The interaction with the server may include, for example, retrieving user information, retrieving user preferences, transmitting information to the application, transmitting media assets to the application, transmitting assembly or compilation instructions to the application, and/ or transmitting messages between the server and the user using the application.

In some embodiments, it is determined whether the user has the application (e.g., the DSUP utility program and a unique identifier) installed on the user's computer. If it is determined that the application is not installed on the user's computer, the application is downloaded by the user (e.g., an installer) and installed on the user's computer. In response to, for example, inputting user preferences and/or creating an account, a unique identifier is generated and provided to the user.

It should be noted that although the embodiments are described herein as being implemented on a personal computer and/or a server, this is only illustrative. The application may be implemented on any suitable platform (e.g., a personal computer ("PC"), a mainframe computer, a dumb terminal, a data display, a wireless terminal, a portable telephone, a portable computer, a palmtop computer, a handheld computer, a laptop computer, a cellular phone, a personal digital assistant ("PDA"), a combined cellular phone and PDA, etc.) to provide such features.

In accordance with some embodiments of the present invention, the application described herein is a Microsoft Windows application written in the C++ programming language. For example, a source code embodiment of the software that implements the functions described herein is provided in the above-referenced U.S. Provisional Patent Application No. 60/861,104, which is hereby incorporated by reference herein in its entirety. However, it should be noted that any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

Referring back to FIG. 1, the application may receive a request from the user for a music lesson at step 120. For example, the application may receive an indication that the user has added a particular lesson (e.g., Blues Solo, Lesson Plan—Week 1) to a shopping cart and purchased that particular lesson. In another example, the application may receive an indication that the user has purchased an entire series of lessons or an entire course (e.g., the entire Blues Solos course, Weeks 1 through 5 of the Blues Solos course, etc.). In yet another example, the application may receive an indication that the user has purchased a subscription package of lessons (e.g., one month of unlimited lessons and courses).

Figure 4:
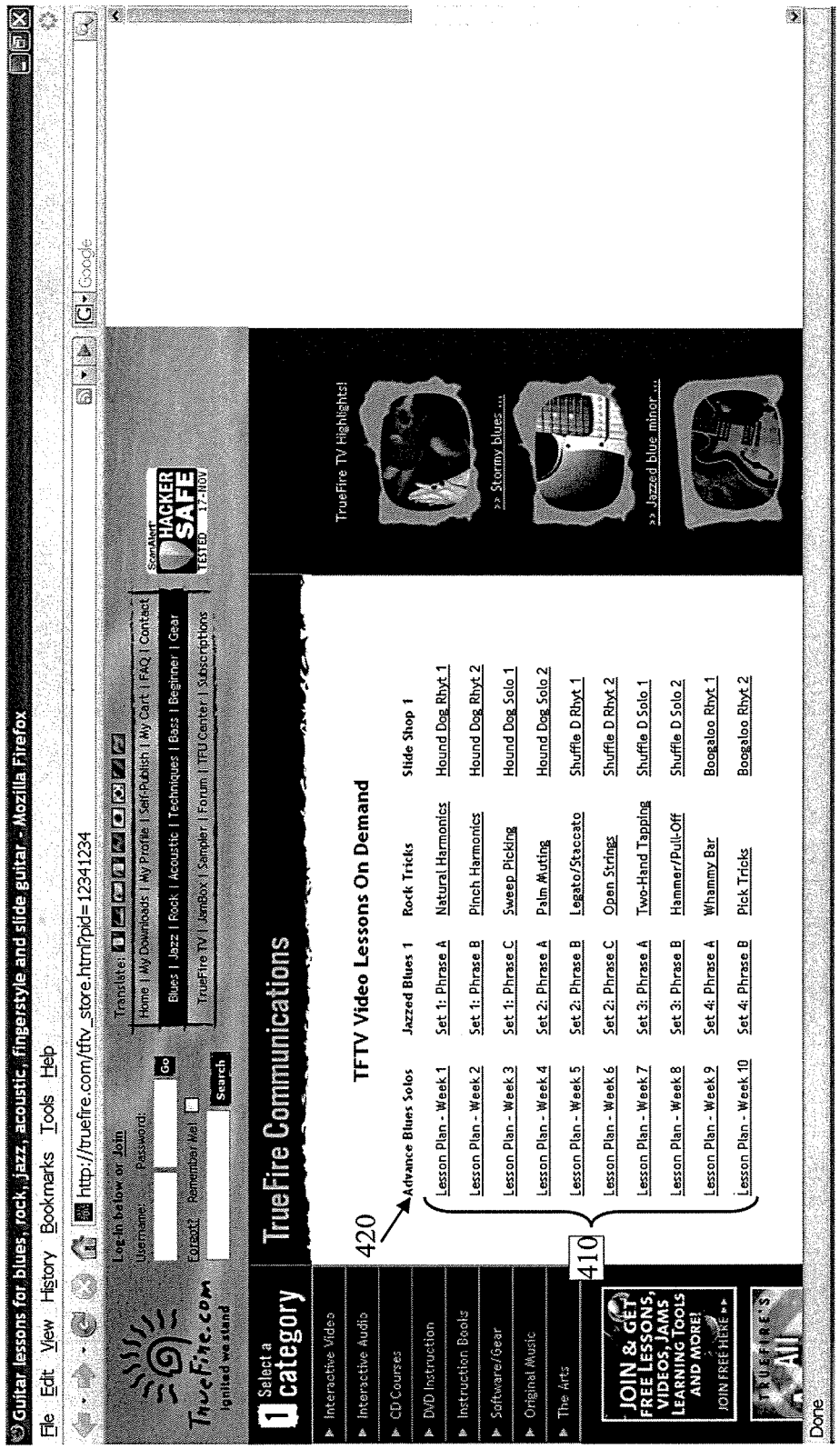
FIG. 4 is an illustrative ordering screen of the interactive education application in accordance with some embodiments of the present invention.

As shown in FIG. 4, the application displays a list 410 of lessons for selection by the user, where each list 410 is separated by course 420. For example, the course "Advanced Blues Solos" is divided into ten weekly lessons. In another example, the course "Rock Tricks" is divided into ten lessons, where each lesson is dedicated to a particular rock trick. As described previously, the application may provide the user with lessons and/or courses using any suitable approach. For example, the application may provide the user with a list of subscriptions to various courses (e.g., a subscription to the Advance Blues Solos course, a general subscription for a predetermined number of lessons, etc.).

Figure 5:
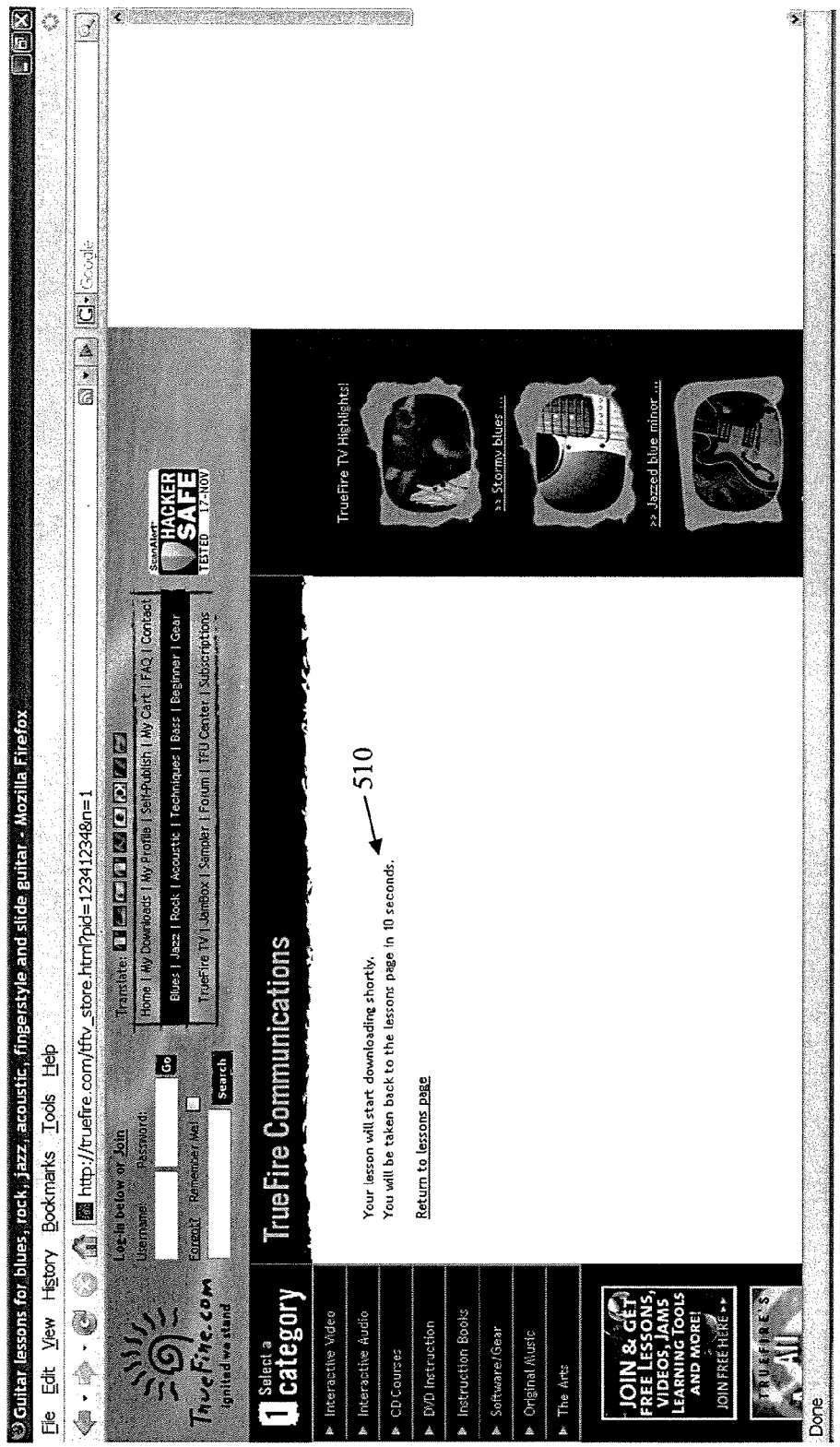
FIG. 5 is an illustrative order confirmation screen of the interactive education application in accordance with some embodiments of the present invention.

As shown in FIG. 5, the application may provide the user with a confirmation message 510 in response to selecting one of the lessons, courses, etc. The confirmation message 510 informs the user that the selected lesson and its particular media assets will be transmitted to the application for compilation and presentation to the user.

Referring back to FIG. 1, in response to receiving the request, the application determines the media assets for retrieval based at least in part on the received user preferences (step 130). For example, the application may determine which media assets to retrieved based on preferred music styles or music genre (e.g., classical, rock, blues, jazz, country, funk, etc.), an education level (e.g., completed Book one of the Suzuki method, three years of playing the guitar with a private instruction, two years of playing the guitar self-taught, one year of playing the guitar with a large class of music students, etc.), information relating to previous instruction (e.g., taught by a private instructor, self-taught, music classes in high school, etc.), information relating to instruments (e.g., the user plays both the bass guitar and the piano), educational goals (e.g., the user wants to be able to play a particular song), or based on any other suitable criteria.

The media assets may include one or more video clips, audio clips, images, text, educational charts, music notation, music tablature, sheet music, or any other suitable content. It should be noted that the media assets may be in a variety of formats, such as, for example, ASCII, HTML, XML, TXT, PDF, PTB (Power Tab Editor), AIFF, AU, WAV, MP3, MIDI, AC3, BMP, JPEG, GIF, TIFF, SWF (Macromedia Flash), AV1, MP4, QuickTime, RealMedia, MPEG, or any other suitable multimedia format or rich media format. It should also be noted that, in some embodiments, the application retrieves only the media assets necessary to provide the first customized lesson.

In response to determining the media assets for retrieval, the application retrieves the media assets from at least one database and transmits the media assets to the user of the application (step 140). The application on the user's computer assembles and compiles the media assets into a personalized lesson. For example, the application may insert media assets into extensible markup language (XML) templates and/or other templates to generate a personalized music lesson. In another example, the application may insert video clips, audio clips, text, PDF files, MP3 files, rich media files, and other media assets into a Macromedia Flash template, compile the retrieved media assets and the template into a Macromedia Flash file for presentation to the user. In yet another example, the application may instruct the server to assemble and compile the particular media assets into a personalized lesson, where the personalized lesson is transmitted in one or more files to the user of the application. This personalized lesson is a full functioning music education software application that presents digital multi-media, music education lessons and courses to the user.

As shown below in Table 1, the application inserts the media assets (e.g., JPG files, PDF files, PTB files, MP3 files, TXT files, SWF files, etc.) into an XML file to generate a personalized music lesson in the course entitled "TrueFire's Take Ten." Although the embodiments are described as being implemented in XML, this is only illustrative.

TABLE 1

```
<categories coursename="TrueFire's Take Ten">
    <category name="Select a lesson below to start ..."
background="data/cat_1/bg1.jpg">
        <lesson name="Blues Alchemy">
            <pdf value="data/charts/bales1.pdf"/>
            <tab value="data/charts/bales1.ptb"/>
            <txt value="data/cat_1/les_2/les2.txt"/>
            <mp3_1 value="data/jams/bales1.mp3"/>
            <video value="data/cat_1/les_2/ba1v1.swf"/>
            <video2 value="data/cat_1/les_2/ba1v2.swf"/>
        </lesson>
        <lesson name="Blues Rock: Secret Sauce">
            <pdf value="data/charts/brsles1.pdf"/>
            <tab value="data/charts/brsles1.ptb"/>
            <txt value="data/cat_1/les_4/les4.txt"/>
            <mp3_1 value="data/jams/brsles1.mp3"/>
            <video value="data/cat_1/les_4/brs1v1.swf"/>
            <video2 value="data/cat_1/les_4/brs1v2.swf"/>
        </lesson>
        <lesson name="Jazz Anatomy"
            <pdf value="data/charts/jales1.pdf"/>
            <tab value="data/charts/jales1.ptb"/>
            <txt value="data/cat_1/les_1/les1.txt"/>
            <mp3_1 value="data/jams/jales1.mp3"/>
            <video value="data/cat_1/les_1/ja1v1.swf"/>
            <video2 value="data/cat_1/les_1/ja1v2.swf"/>
        </lesson>
        <lesson name="Innovations for Acoustic Guitar">
            <pdf value="data/charts/iagles1.pdf"/>
```

TABLE 1-continued

```
        <tab value="data/charts/iagles1.ptb"/>
        <txt value="data/cat_1/les_6/les6.txt"/>
        <video value="data/cat_1/les_6/iagles1v1.swf"/>
        <video2 value="data/cat_1/les_6/iagles1v2.swf"/>
    </lesson>
    <lesson name="Bluesology">
        <pdf value="data/charts/bologyles1.pdf"/>
        <txt value="data/cat_1/les_7/les7.txt"/>
    <mp3_1 value="data/jams/bologyles1.mp3"/>
        <video value="data/cat_1/les_7/bology1v1.swf"/>
        <video2 value="data/cat_1/les_7/bology1v2.swf"/>
    </lesson>
    <lesson name="New School Fingerstyle Blues">
        <pdf value="data/charts/nsfbles1.pdf"/>
        <tab value="data/charts/nsfbles1.ptb"/>
        <txt value="data/cat_1/les_3/les3.txt"/>
        <video value="data/cat_1/les_3/nsfb1v1.swf"/>
        <video2 value="data/cat_1/les_3/nsfb1v2.swf"/>
    </lesson>
    <lesson name="Total Modal">
        <pdf value="data/charts/tmles1.pdf"/>
        <tab value="data/charts/tmles1.ptb"/>
        <txt value="data/cat_1/les_8/les8.txt"/>
    <mp3_1 value="data/jams/tmles1.mp3"/>
        <video value="data/cat_1/les_8/tm1v1.swf"/>
        <video2 value="data/cat_1/les_8/tm1v2.swf"/>
    </lesson>
    <lesson name="Vamps, Jams & Improvisation">
        <pdf value="data/charts/vjiles1.pdf"/>
        <tab value="data/charts/vjiles1.ptb"/>
        <txt value="data/cat_1/les_9/les9.txt"/>
    <mp3_1 value="data/jams/vjiles1.mp3"/>
        <video value="data/cat_1/les_9/vji1v1.swf"/>
        <video2 value="data/cat_1/les_9/vji1v2.swf"/>
    </lesson>
    <lesson name="Rock Solid">
        <pdf value="data/charts/rsles1.pdf"/>
        <tab value="data/charts/rsles1.ptb"/>
        <txt value="data/cat_1/les_5/les5.txt"/>
    <mp3_1 value="data/jams/rsles1.mp3"/>
        <video value="data/cat_1/les_5/rs1v1.swf"/>
        <video2 value="data/cat_1/les_5/rs1v2.swf"/>
    </lesson>
    <lesson name="Blues Rock: Evolution">
        <pdf value="data/charts/breles1.pdf"/>
        <tab value="data/charts/breles1.ptb"/>
        <txt value="data/cat_1/les_10/les10.txt"/>
    <mp3_1 value="data/jams/breles1.mp3"/>
        <video value="data/cat_1/les_10/bre1v1.swf"/>
        <video2 value="data/cat_1/les_10/bre1v2.swf"/>
    </lesson>
    </category>
</categories>
```

Alternatively, the application may download media assets and compile a personalized lesson for the user at a predetermined time (e.g., on a scheduled basis, weekly, etc.), upon receiving an indication from an instructor (e.g., in response to the instructor determining and/or indicating that the user is ready for the next lesson), upon receiving a message from the user (e.g., a communication using the application indicating that the user is ready for the next lesson), and/or automatically in response to receiving user preferences.

Figures 6A, 6B:
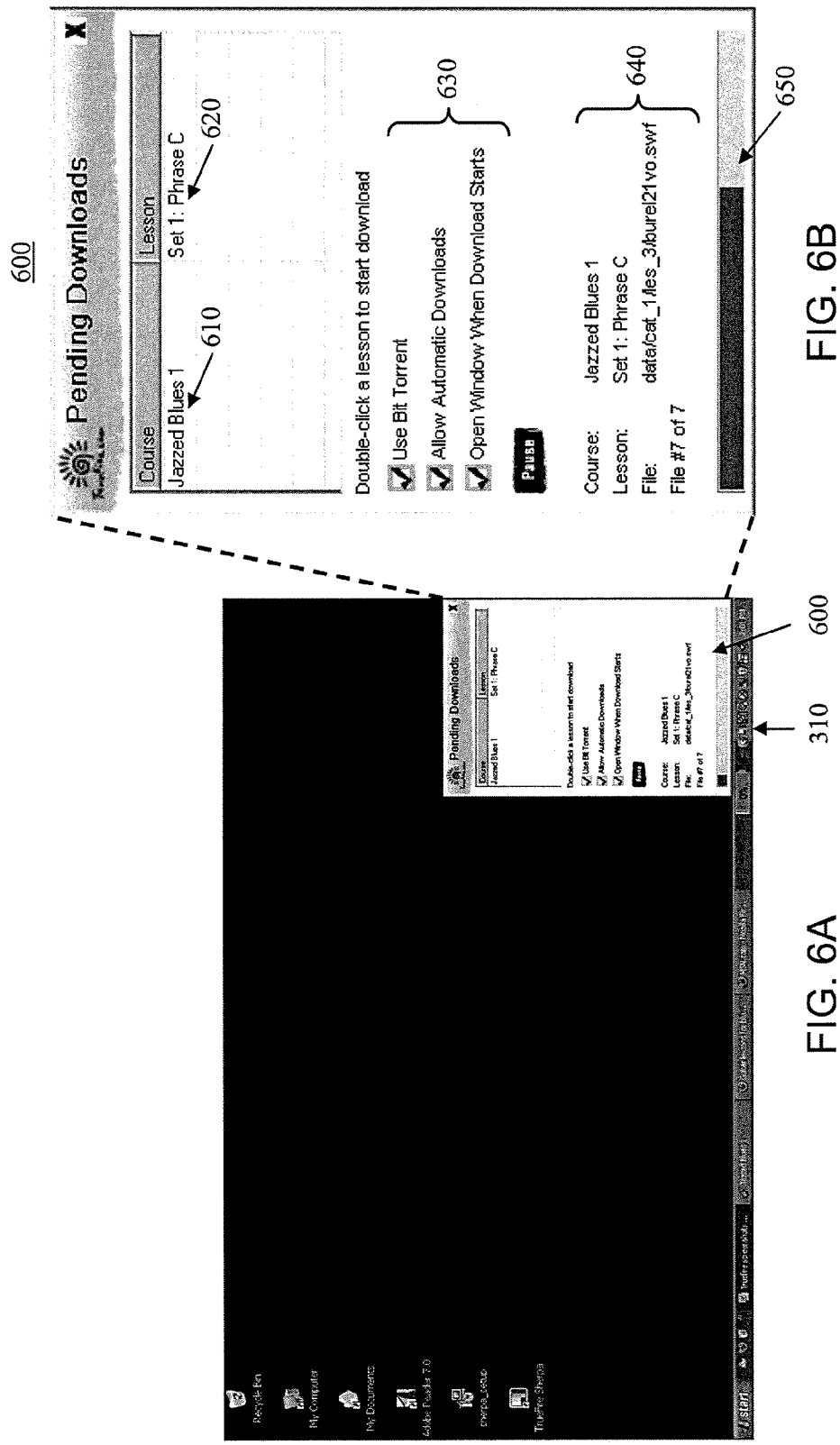
FIGS. 6A and 6B are illustrative download screens of the interactive education application in accordance with some embodiments of the present invention.

As shown in FIGS. 6A and 6B, in response to receiving the user request for a lesson, the application provide the user with download window 600. Download window 600 includes, for example, the name of the course 610 (e.g., Jazzed Blues 1), the name of the lesson 620 (e.g., Set 1: Phrase C), download options 630 (e.g., allow automatic downloads), media asset information 640 (e.g., file 7 of 7 is burel21vo.swf), and a progress bar 650. The application may provide download window 600 as a pop-up window to inform the user that media assets are being downloaded from one or more databases and a personalized lesson is being assembled by the application.

Figure 7A:
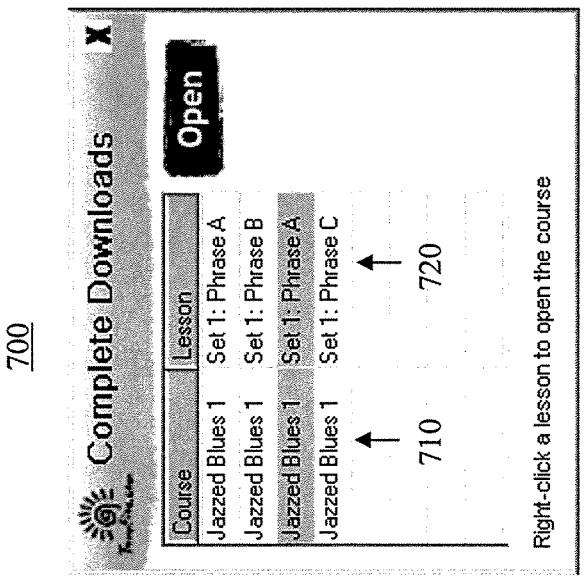
FIGS. 7A and 7B are illustrative of the interactive education application in accordance with some embodiments of the present invention.
Figure 7B:

As shown in FIGS. 7A and 7B, in response to transmitting the media assets and/or other content and assembling the personalized lesson, the application may provide the user with completed downloads window 700 of FIG. 7A that provides the user with list of completed downloads sorted by course 710 and lesson 720. The application may also provide the user with courses window 750 of FIG. 7B that provides the user with a list of available courses created for the user.

Figure 8:
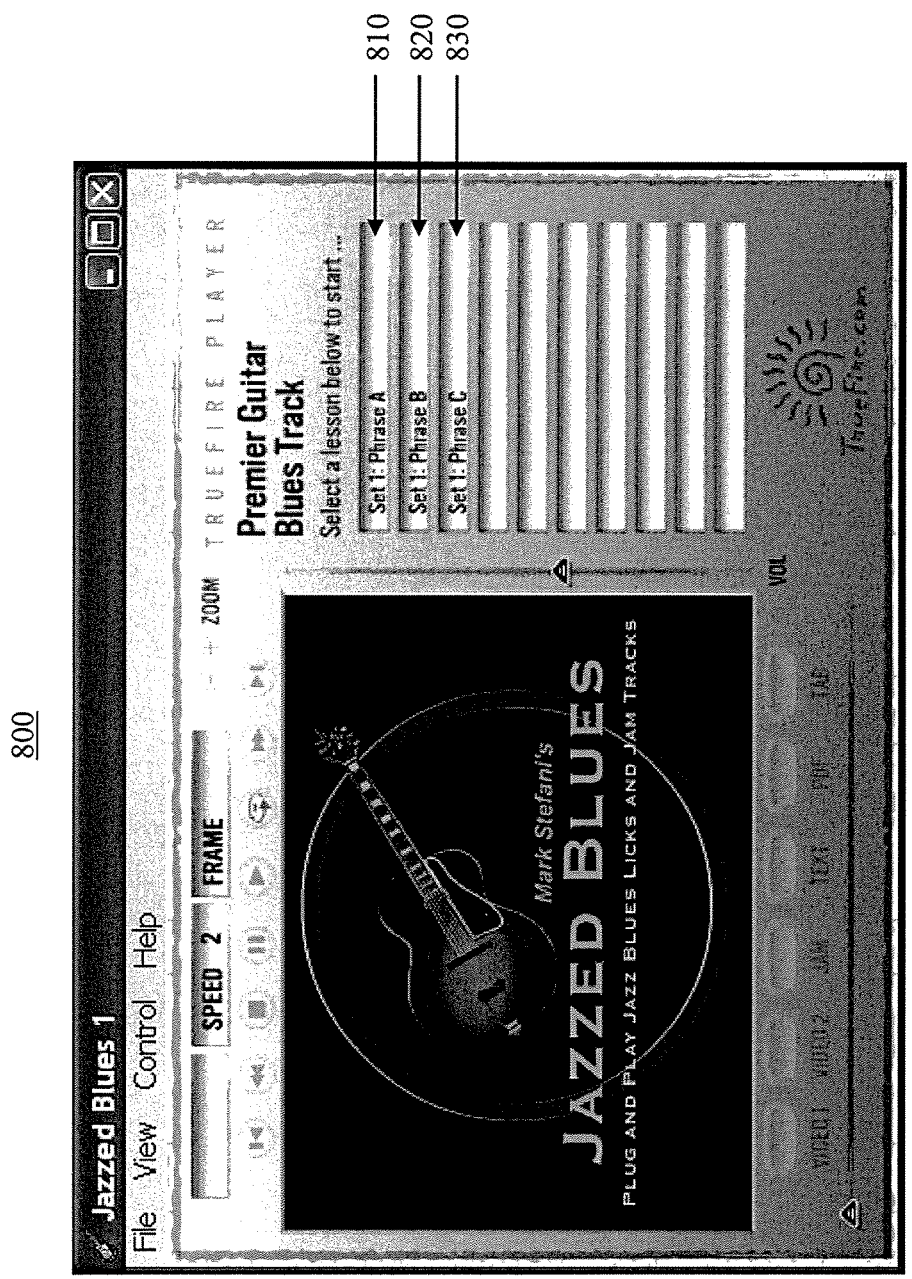
FIGS. 8-12B are illustrative personalized lesson screens of the interactive education application in accordance with some embodiments of the present invention.

As shown in FIG. 8, in response to selecting one of the personalized lessons from window 700 of FIG. 7A or from window 750 from FIG. 7B, the application displays the personalized course with one or more personalized lessons for the user. As shown, three personalized lessons 810, 820, and 830 may be selected by the user.

It should be noted that, in some embodiments, personalized lesson 810 (e.g., Set 1: Phrase A) was assembled for the user prior to personalized lessons 820 and 830. Alternatively, in response to the user purchasing a package of lessons or subscription, the application may assemble personalized lessons 810, 820, and 830 for the user simultaneously.

Figure 9:
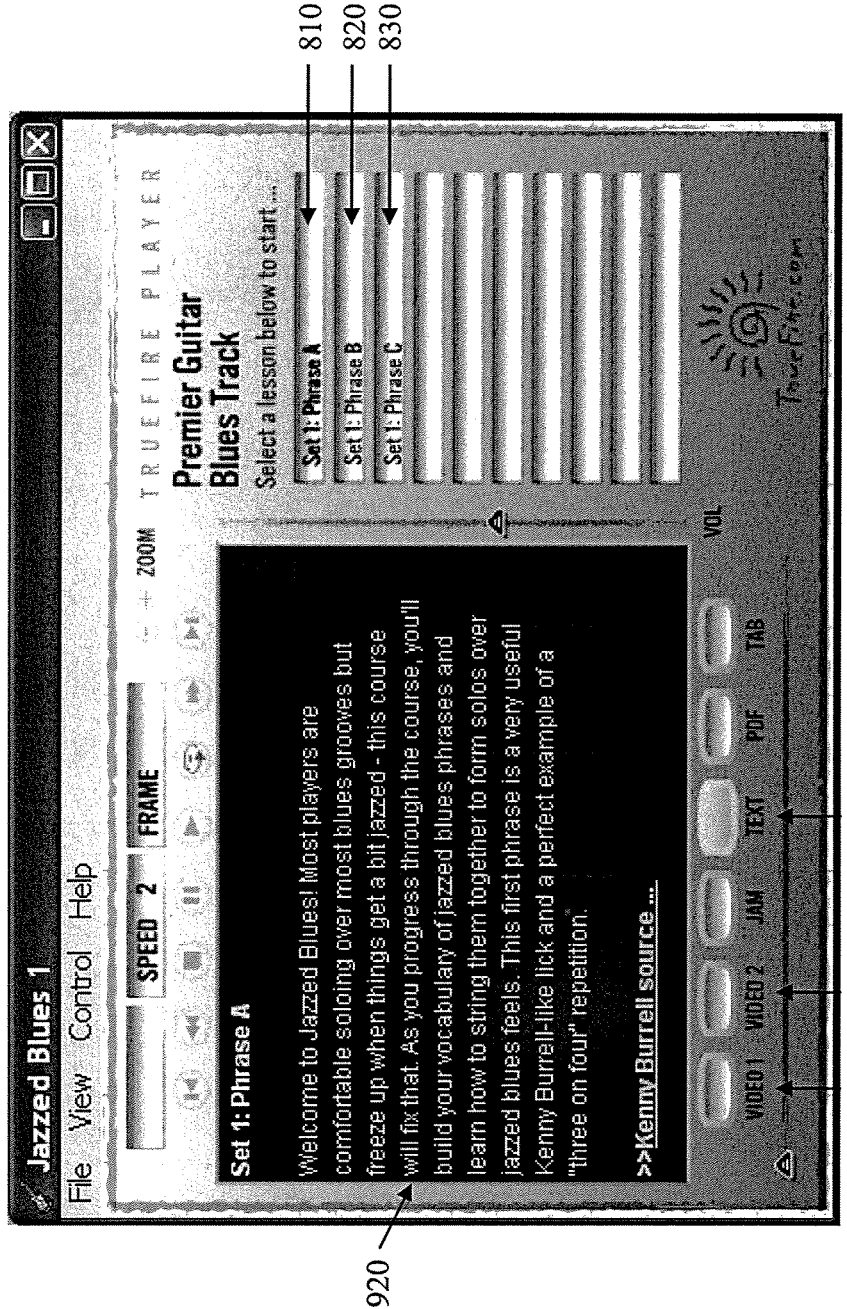

As shown in FIG. 9, in response to the user selecting personalized lesson 810 of FIG. 8, the application displays a description of the lesson 920. In this example, the application may allow the user to return to the description of the lesson 920 in response to selecting a text button 910. The description 920 may also include, for example, information on how the application selected the particular media assets, information on the particular media assets, or any other suitable information relating to the lesson.

Figure 10:
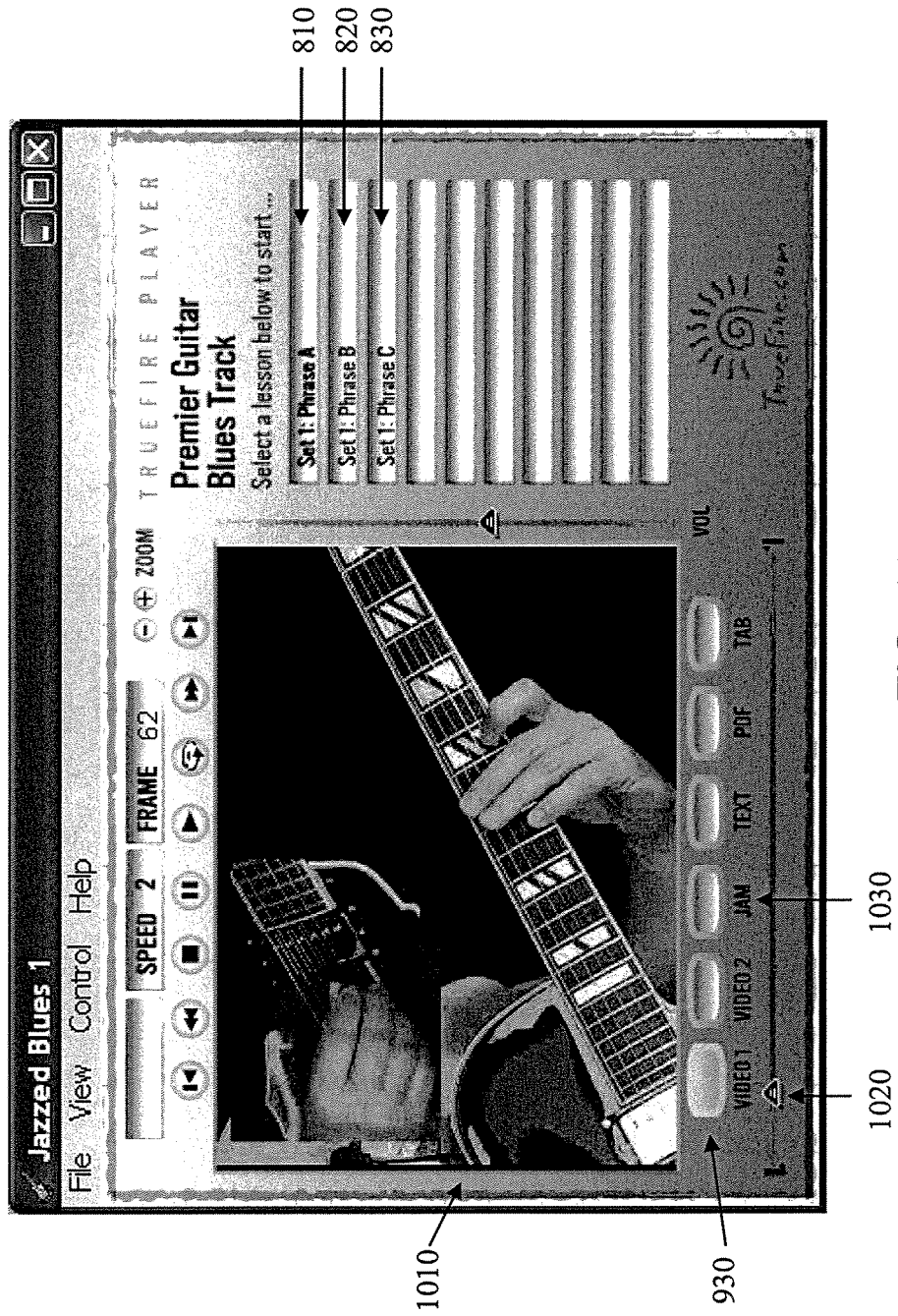

In response to the user selecting video button 930 or any other suitable interface, the application provides the user with one or more of the associated video media assets. As shown in FIG. 10, the application displays video window 1010 that shows the video media asset associated with the lesson. While the video media asset is being played back, the application provides the user with progress bar 1020.

Figure 11:
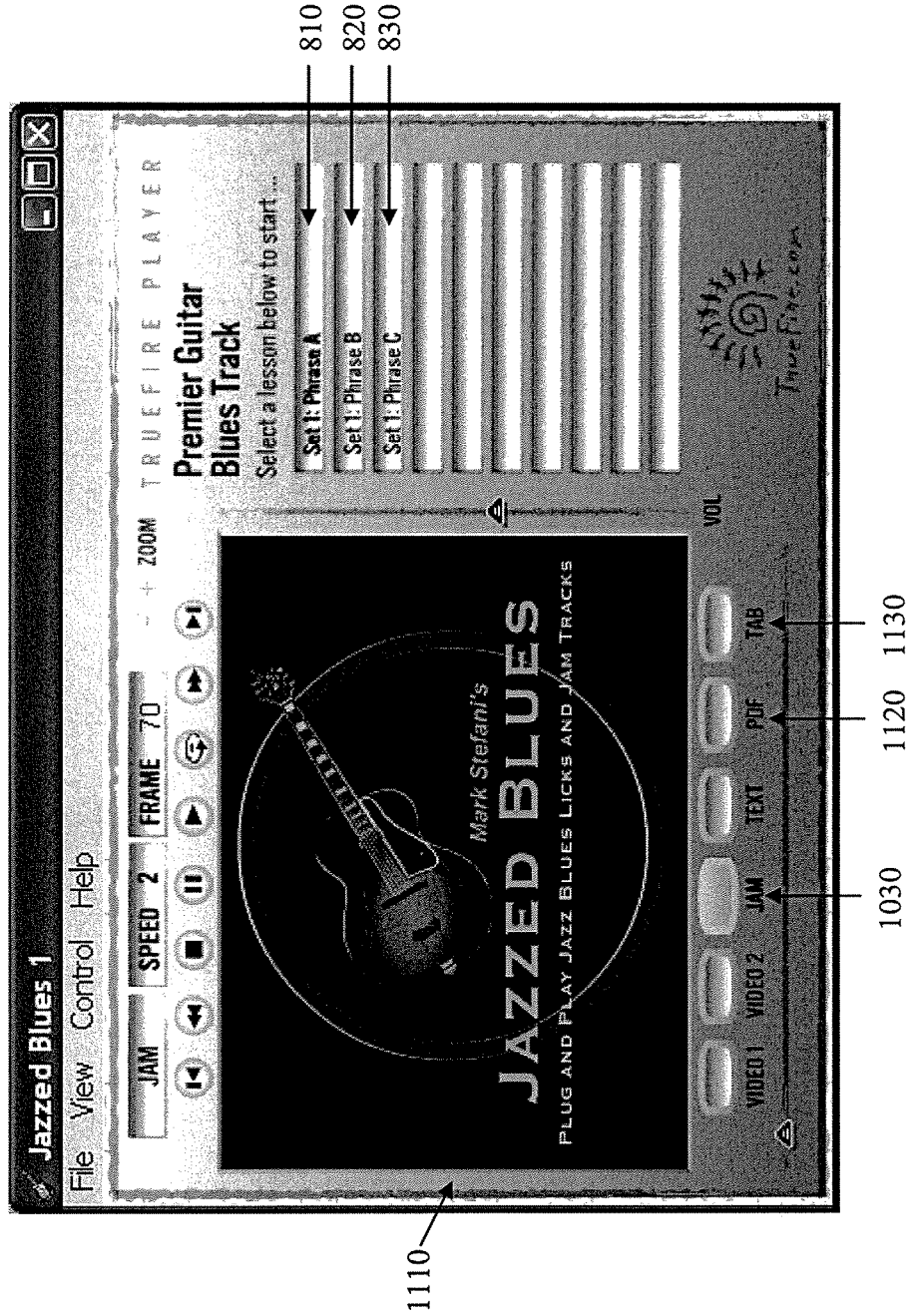

Similarly, in response to the user selecting jam button 1030 or any other suitable interface, the application provides the user with one or more of the associated audio media assets in window 1110 as shown in FIG. 11. For example, the application provides the user with a media asset, such as an MP3 audio clip, to practice the techniques from the lesson, practice playing with other instruments, and/or practice improvisation.

Figure 12A:
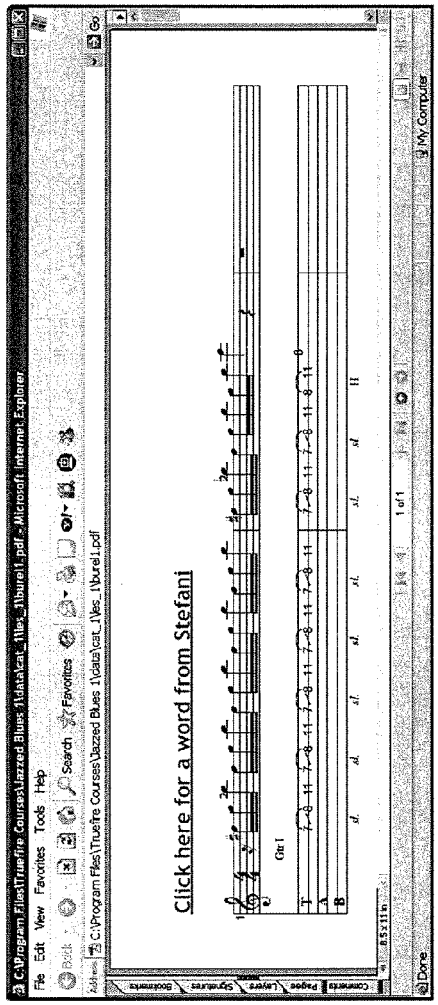
Figure 12B:
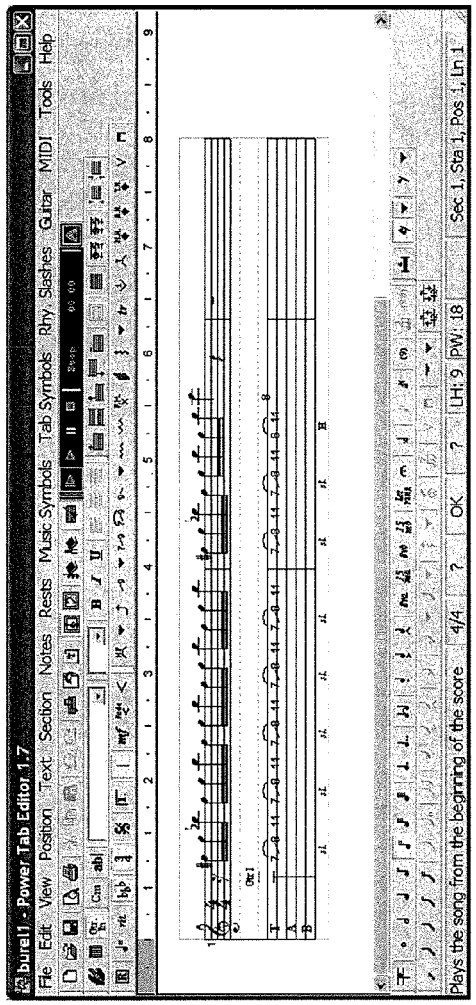

In response to the user selecting PDF button 1120, tab button 1130, or any other suitable interface, the application provides the user with the music tablature 1210 and 1220, respectively, as shown in FIGS. 12A and 12B. In some embodiments, the application may provide the user with multiple tablatures—e.g., one to practice the particular techniques from the lesson, one to play a particular song that uses the techniques from the lesson, etc.

Figure 13:
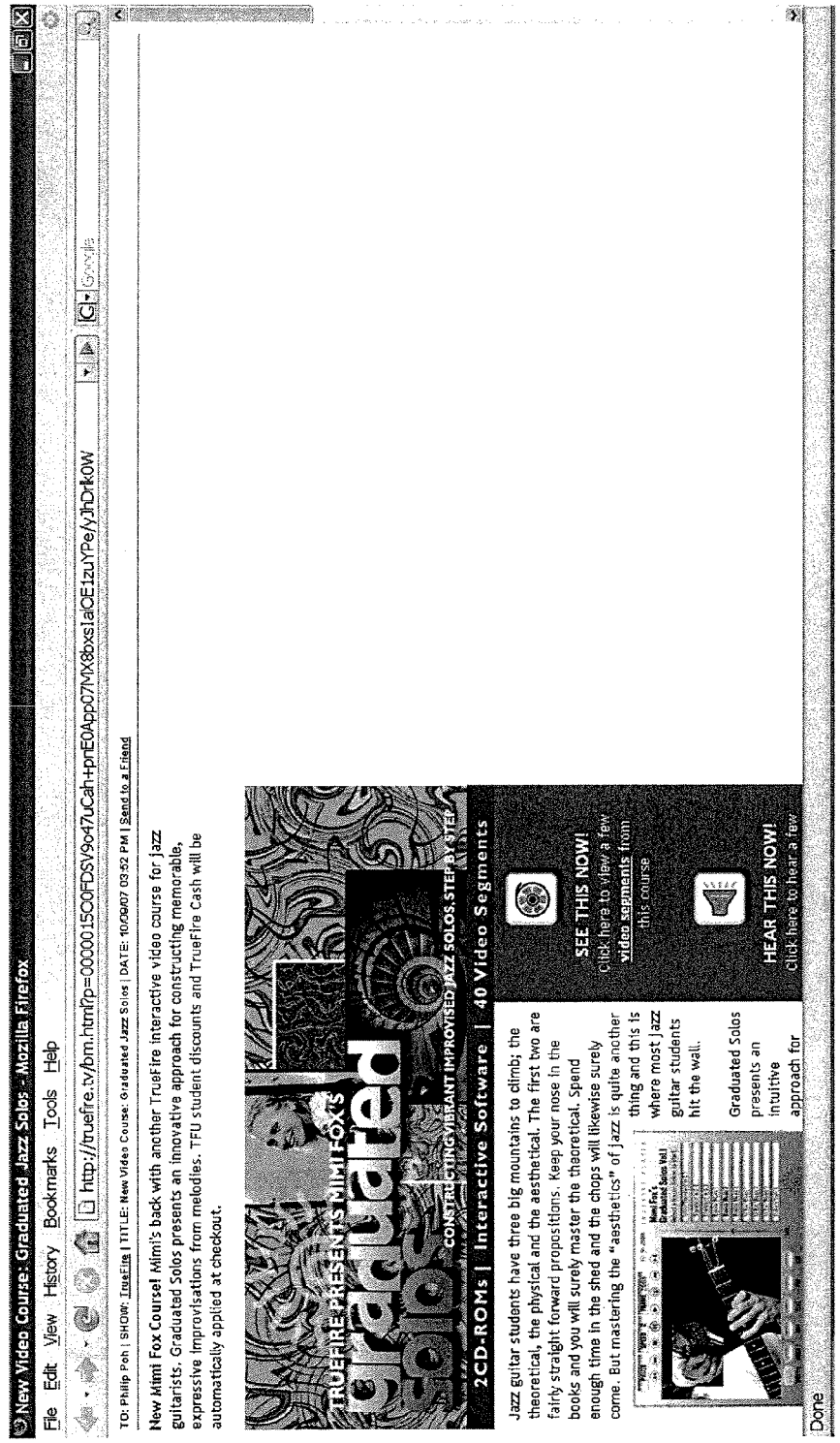
FIG. 13 is an illustrative messaging screen of the interactive education application in accordance with some embodiments of the present invention.

In some embodiments, the application may provide the user with messaging features. For example, as shown in FIG. 13, the application may provide the user with a message when a new course or a new lesson is available to the user. As shown in FIG. 13, an XML page is assembled that informs the user of a new music course entitled "Mimi Fox's Graduated Solos." The user may purchase one or more lessons from the course, review a description of the course, view video segments and/or other particular media assets (e.g., sample audio clip, sample tablature, etc.) that are part of the course, and/or send messages to other users that enrolled or purchased the course.

In some embodiments, the application may allow the user to receive messages from the server. For example, the application may receive a message that informs the user about when the user will receive the next lesson. In another example, the user, using the application, may transmit a message indicating that the user is ready for the next lesson.

Referring back to FIG. 1, the application automatically determines whether updated media assets are available from at least one database (step 150). The application may perform this determination on-demand, continuously, at predetermined times (e.g., daily, weekly, a week after the last lesson, etc.), every time the user launches the application, or every time the user access a particular lesson or course. In response to determining that updated media assets are available, the application retrieves the updated media assets, where the application assembles and compiles the updated media assets with the previously transmitted media assets into the personalized music lesson (step 160).

In some embodiments, the application may determine whether updated media assets are available in response to receiving an indication that the user has changed the user preferences. For example, in response to the user indicating that the user wants to learn jazz instead of rock, the application may retrieve one or more media assets that replace or supplement the previously retrieved media assets.

In some embodiments, the application may allow the user to communicate with other users, such as instructors, lesson designers, or any other suitable entity. For example, the application may allow the user to transmit a message to an instructor about a particular difficulty with the personalized lesson. In response, the application may receive a response from the instructor and provide the response to the user. Alternatively, the application may allow the user to transmit a recorded music clip to an instructor for critique or evaluation. In another example, the application may allow the user to transmit a message to a lesson designer regarding the personalized lesson. In response to the message, the lesson designer may adjust the rules used to select media assets for creating personalized lessons.

In some embodiments, the application may allow the user to select, compile, and present music lesson and courses on-demand, thereby crafting the user's own customized version of the application. For example, the application may allow the user to select from a library of media assets. In response to selecting particular media assets, the application may retrieve those selected media assets, and compile a personalized lesson or lessons based on the user selections.

In some embodiments, the application may allow the user to provide feedback to communicate with other users, such as instructors, lesson designers, or any other suitable entity and inform those users about whether the user is excelling or having difficulty with a particular lesson. For example, the application may allow the user to transmit a message to a lesson designer about a particular difficulty with the personalized lesson. In response to the message, the lesson designer may adjust the rules used to select media assets for creating personalized lessons, thereby proactively modifying the particular lessons and/or courses based on the feedback from the user.

It should be noted that the feedback from the user may be, for example, a submitted recording or a copy of an online assessment between the user and an instructor. The assessment between the user and the instructor may include behavior data with respect to the lessons the user actually selects as opposed to what the user stated in the profile (e.g., many students want to play jazz because they believe they are interested in it and select such interests in their user profiles, but actually do not want to play jazz).

In some embodiments, the application may detect whether the user is not progressing with the personalized lesson and, in response, may actively intervene with alternative lessons to keep the user engaged. For example, the application may determine that the user has not requested for the next lesson when the user has purchased a subscription or a package of lessons. In response, the application may compile a revised personalized lesson without interaction from the user. Alternatively, the application may determine that the user has not request for the next lesson within a predetermined amount of time and, in response, transmit a message to the user that queries the user's progress (e.g., is the lesson too difficult, is the lesson too easy, does the lesson not cover the material you requested, etc.). In response to receiving a response to the message from the user, the application may compile a revised personalized lesson.

Figure 14:
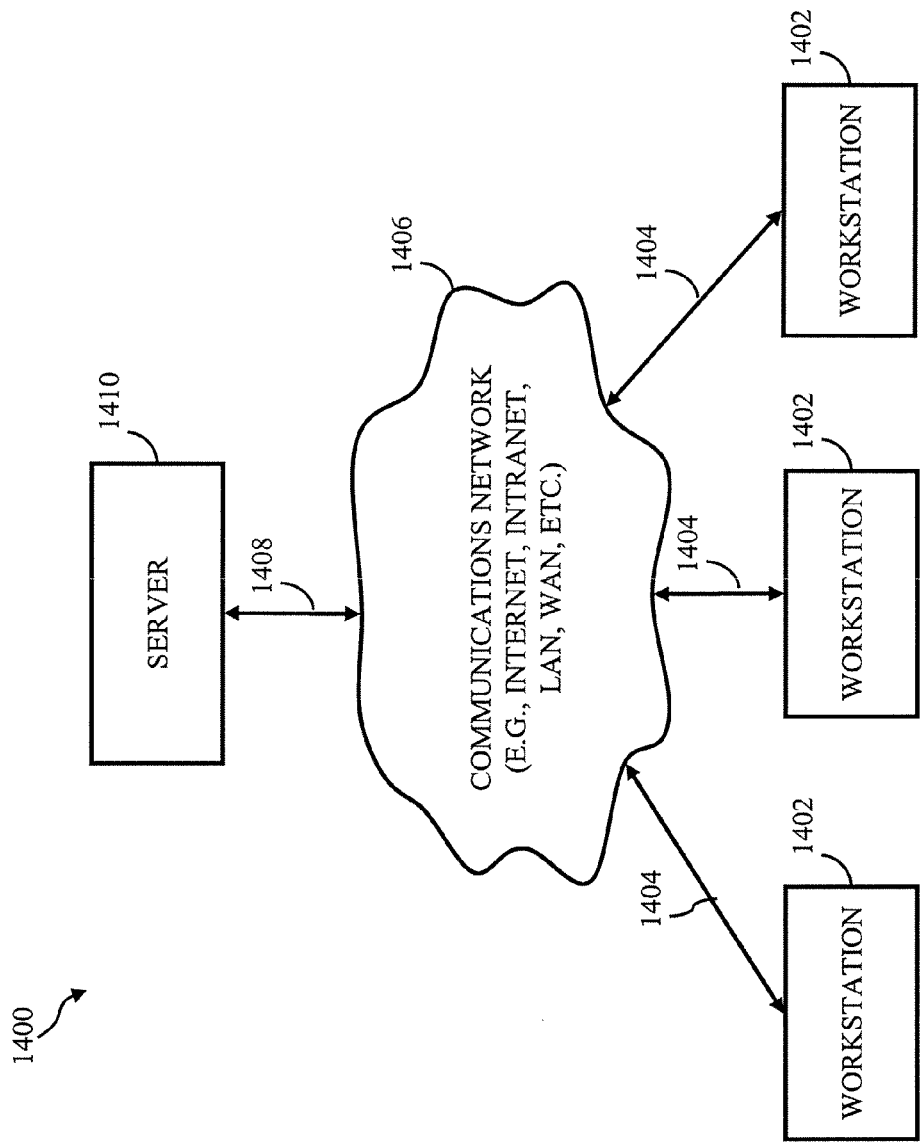
FIG. 14 is a schematic diagram of an illustrative education system on which an interactive education application may be implemented in accordance with some embodiments of the present invention.

FIG. 14 is a generalized schematic diagram of a system 1400 on which an interactive user display application may be implemented in accordance with some embodiments of the present invention. As illustrated, system 1400 may include one or more workstations 1402. Workstations 1402 may be local to each other or remote from each other. Workstations 1402 are connected by one or more communications links 1404 to a communications network 1406 that is linked via a communications link 1408 to a server 1410.

System 1400 may include one or more servers 1410. Server 1410 may be any suitable server for providing access to the application, such as a processor, a computer, a data processing device, or a combination of such devices. Communications network 1406 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 1404 and 1408 may be any communications links suitable for communicating data between workstations 1402 and server 1410, such as network links, dial-up links, wireless links, hard-wired links, any other suitable communications links, or a combination of such links. Workstations 1402 enable a user to access features of the application. Workstations 1402 may be personal computers, laptop computers, mainframe computers, dumb terminals, data displays, Internet browsers, personal digital assistants ("PDAs"), two-way pagers, wireless terminals, portable telephones, handheld devices, any other suitable access device, or any combination of such devices. Workstations 1402 and server 1410 may be located at any suitable location. In one embodiment, workstations 1402 and server 1410 may be located within an organization. Alternatively, workstations 1402 and server 1410 may be distributed between multiple organizations.

Figure 15:
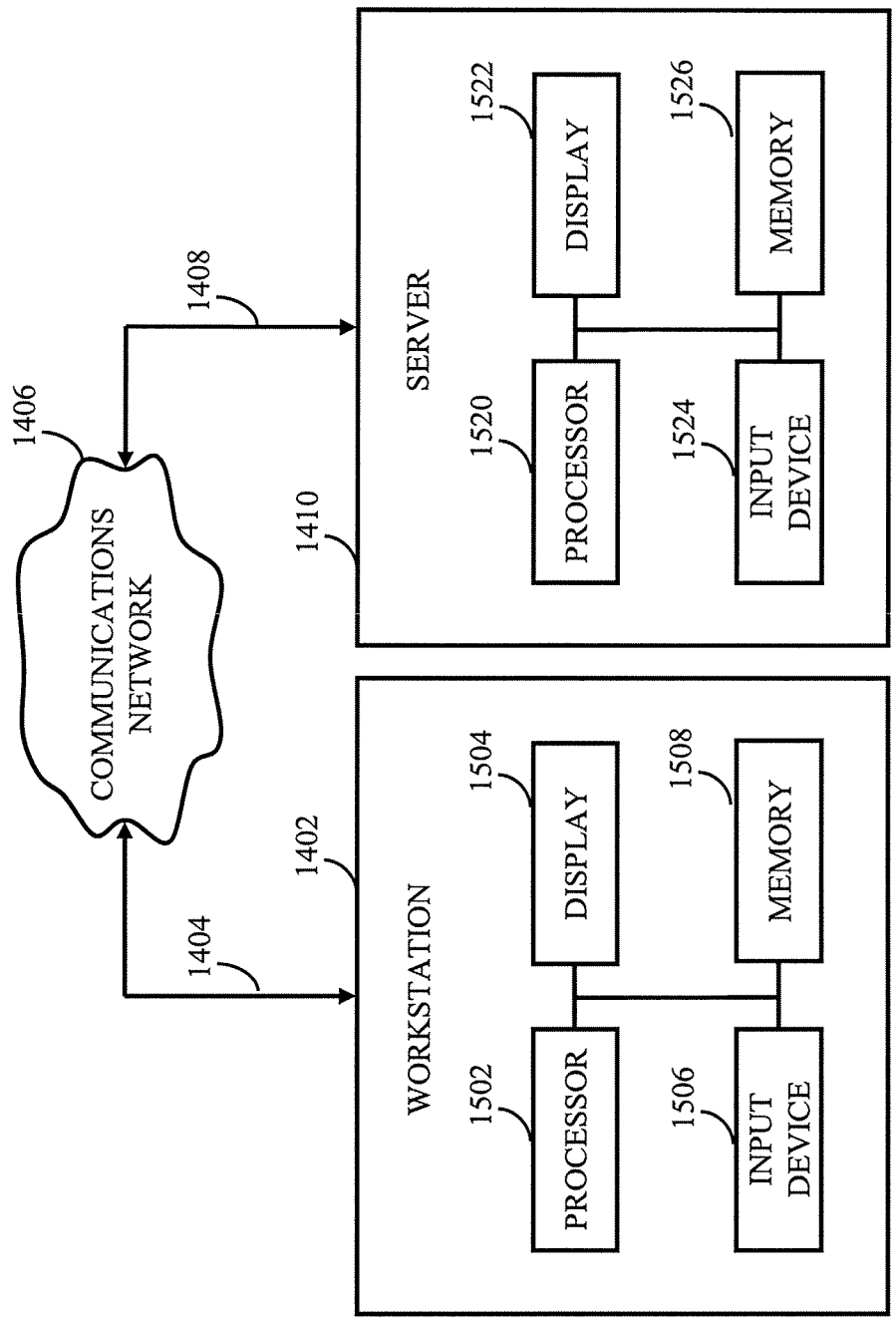
FIG. 15 is a schematic diagram of an illustrative workstation and server as provided, for example, in FIG. 14 in accordance with some embodiments of the present invention.

The server and one of the workstations, which are depicted in FIG. 14, are illustrated in more detail in FIG. 15. Referring to FIG. 15, workstation 1402 may include processor 1502, display 1504, input device 1506, and memory 1508, which may be interconnected. In a preferred embodiment, memory 1508 contains a storage device for storing a workstation program for controlling processor 1502.

Processor 1502 uses the workstation program to present on display 1504 the application and the data received through communications link 1404 and commands and values transmitted by a user of workstation 1402. It should also be noted that data received through communications link 1404 or any other communications links may be received from any suitable source. Input device 206 may be a computer keyboard, a cursor-controller, dial, switchbank, lever, or any other suitable input device as would be used by a designer of input systems or process control systems. In some embodiments, input device 206 may be an instrument with a Musical Instrument Digital Interface (MIDI), which enables electronic musical instruments, computers, and other suitable equipment to communicate, control, and synchronize with each other.

Server 1410 may include processor 1520, display 1522, input device 1524, and memory 1526, which may be interconnected. In a preferred embodiment, memory 1526 contains a storage device for storing data received through communications link 1408 or through other links, and also receives commands and values transmitted by one or more users. For example, memory 1526 includes the multiple databases that store the plurality of media assets. The storage device further contains a server program for controlling processor 1520.

In some embodiments, the application may include an application program interface (not shown), or alternatively, the application may be resident in the memory of workstation 1402 or server 1410. In another suitable embodiment, the only distribution to workstation 1402 may be a graphical user interface ("GUI") which allows a user to interact with the application resident at, for example, server 1410.

In one particular embodiment, the application may include client-side software, hardware, or both. For example, the application may encompass one or more Web-pages or Webpage portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a workstation and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet, an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Accordingly, an interactive education application is provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A computer implemented method for generating music lessons, the method comprising:

receiving, by the computer from a user, preferences associated with a music lesson, wherein the preferences include: a music style or a music genre, an educational level, information relating to previous instruction, information relating to a musical instrument, and an educational goal;

receiving, by the computer from the user, at least one recorded video or audio music clip of a first music performance by the user or a first sample of the user's techniques and skill level to be evaluated;

transmitting, by the computer, to an instructor the received preferences associated with the music lesson for assessment to the music lesson and the at least one recorded video or audio music clip;

receiving, by the computer, from the instructor the assessment to the music lesson responsive to the received preferences and the at least one recorded video or audio music clip;

determining, by the computer, a first subset of media assets to retrieve from a plurality of media assets based on the received preferences and the assessment from the instructor, wherein each media asset comprises a full functioning music education experience including: a lesson plan, a video clip or an audio clip, text, an educational chart, music notation, a first music tablature including a first lesson to practice a particular technique from the music lesson or to play a particular song that uses the particular technique from the music lesson and sheet music;

retrieving the first subset of media assets from a database while simultaneously transmitting a message to the user relating to the generation of the music lesson and the first subset of media assets;

compiling the first subset of media assets into a personalized music lesson, wherein the compiling further comprises inserting a plurality of the first subset of media assets into the lesson plan, thereby generating the personalized music lesson;

transmitting the personalized music lesson to the user;

detecting whether the user is progressing with the personalized music lesson;

when said detecting determines that the user has not progressed, automatically compiling a revised personalized music lesson without interaction from the user;

automatically retrieving a second subset of media assets from the database in response to receiving at least an indication from the user, while simultaneously transmitting an update message to the user relating to the generation of a subsequent music lesson;

compiling the second subset of media assets into a subsequent personalized music lesson, wherein the compiling further comprises replacing a plurality of the first subset of media assets with the second subset of media assets in the lesson plan, thereby generating the subsequent personalized music lesson; and transmitting the subsequent personalized music lesson to the user.

2. The method of claim 1, further comprising:

receiving an indication that the user has changed the preferences; and retrieving one or more media assets that replace or supplement previously retrieved media assets responsive to the user changing the preferences.

3. The method of claim 1, wherein said detecting whether the user is progressing further comprises determining that the user has not requested another music lesson when the user has purchased at least one of a subscription or a package of lessons; and wherein said method further comprises in response to said determining that the user has not requested another music lesson, automatically compiling the revised personalized music lesson without interaction from the user.

4. The method of claim 1, further comprising:

enabling the user to transmit a recorded music clip to the instructor for critique or evaluation;

enabling the user to transmit a message to a lesson designer regarding the personalized music lesson;

enabling the lesson designer to adjust the rules used to select the media assets for creating personalized music lessons; and enabling the user to provide feedback to communicate with other users, including instructors and lesson designers, and to inform whether the user is progressing or having difficulty with a particular music lesson.

5. The method of claim 1, further comprises retrieving the second subset of media assets responsive to a predetermined time or receiving an indication from the instructor, thereby generating the subsequent personalized music lesson.

6. The method of claim 5, further comprising:

enabling the user to transmit a recorded music clip to the instructor for critique or evaluation;

enabling the user to transmit a message to a lesson designer regarding the personalized music lesson;

enabling the lesson designer to adjust the rules used to select the media assets for creating personalized music lessons; and enabling the user to provide feedback to communicate with other users, including instructors and lesson designers, and to inform whether the user is progressing or having difficulty with a particular music lesson.

7. The method of claim 6, wherein said detecting whether the user is progressing further comprises determining that the user has not requested another music lesson when the user has purchased at least one of a subscription or a package of lessons; and wherein said method further comprises in response to said determining that the user has not requested another music lesson, automatically compiling the revised personalized music lesson without interaction from the user.

8. The method of claim 1, wherein receiving preferences further comprises receiving information relating to previous instruction including type of instruction, number of years of instruction, a self-assessment for the level of play; instruments the user has previously played; level of difficulty of songs that the user has played; and particular techniques that the user has mastered.

* * * * *